(12) United States Patent
Pritzen et al.

(10) Patent No.: US 8,991,761 B2
(45) Date of Patent: Mar. 31, 2015

(54) ACTUATING MECHANISM FOR A VENT DOOR

(75) Inventors: Thomas Pritzen, Inningen (DE); Markus Buhler, Unterschneidheim (DE); Thomas Tendyra, Schwenningen (DE)

(73) Assignee: Aibus Helicopters Deutschland GmbH, Donauworth (DE)

( * ) Notice: Subject to any disclaimer, the term of this patent is extended or adjusted under 35 U.S.C. 154(b) by 208 days.

(21) Appl. No.: 13/191,763

(22) Filed: Jul. 27, 2011

(65) Prior Publication Data

US 2012/0032028 A1    Feb. 9, 2012

(30) Foreign Application Priority Data

Aug. 5, 2010   (EP) .................................... 10400038

(51) Int. Cl.
*B64C 1/14*   (2006.01)
(52) U.S. Cl.
CPC .................................. *B64C 1/1407* (2013.01)
USPC ...................................................... 244/129.5
(58) Field of Classification Search
CPC .. B64C 1/1407; B64C 1/1415; B64C 1/1423; B64C 1/143

USPC ....................................................... 244/129.5
See application file for complete search history.

(56) References Cited

U.S. PATENT DOCUMENTS

| 4,497,462 | A | | 2/1985 | Hamatani | |
|---|---|---|---|---|---|
| 5,163,639 | A | * | 11/1992 | Herrmann et al. | ......... 244/129.5 |
| 5,305,969 | A | | 4/1994 | Odell | |
| 5,337,977 | A | * | 8/1994 | Fleming et al. | ............ 244/129.5 |
| 6,116,542 | A | * | 9/2000 | Erben | ........................ 244/129.5 |
| 6,454,210 | B1 | | 9/2002 | Plattner | |
| 2002/0000493 | A1 | * | 1/2002 | Erben et al. | ................ 244/129.5 |

FOREIGN PATENT DOCUMENTS

GB         2361743 A     10/2001

OTHER PUBLICATIONS

Search Report and Written Opinion; Application No. EP 10400038; dated Dec. 5, 2011.

* cited by examiner

*Primary Examiner* — Brian M O'Hara
(74) *Attorney, Agent, or Firm* — Brooks Kushman P.C.

(57) ABSTRACT

An actuating mechanism (1) for a vent door (2) in an aircraft door (3) comprising an electric motor (4) driving the vent door (2) in a closing position towards the aircraft door (3), a control unit (9), controlling said electric motor (4), and a flight lock actuator, driven by the electric motor (4). A return spring biases the vent door (2) to an open position.

20 Claims, 2 Drawing Sheets

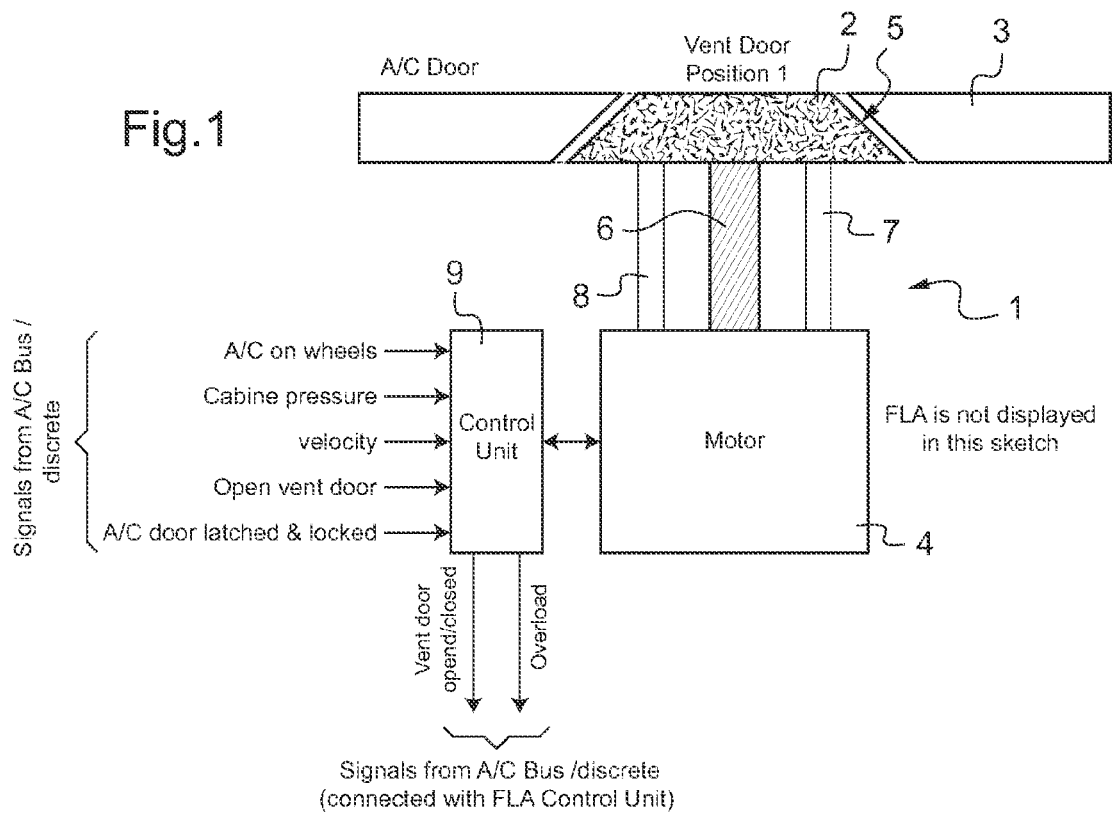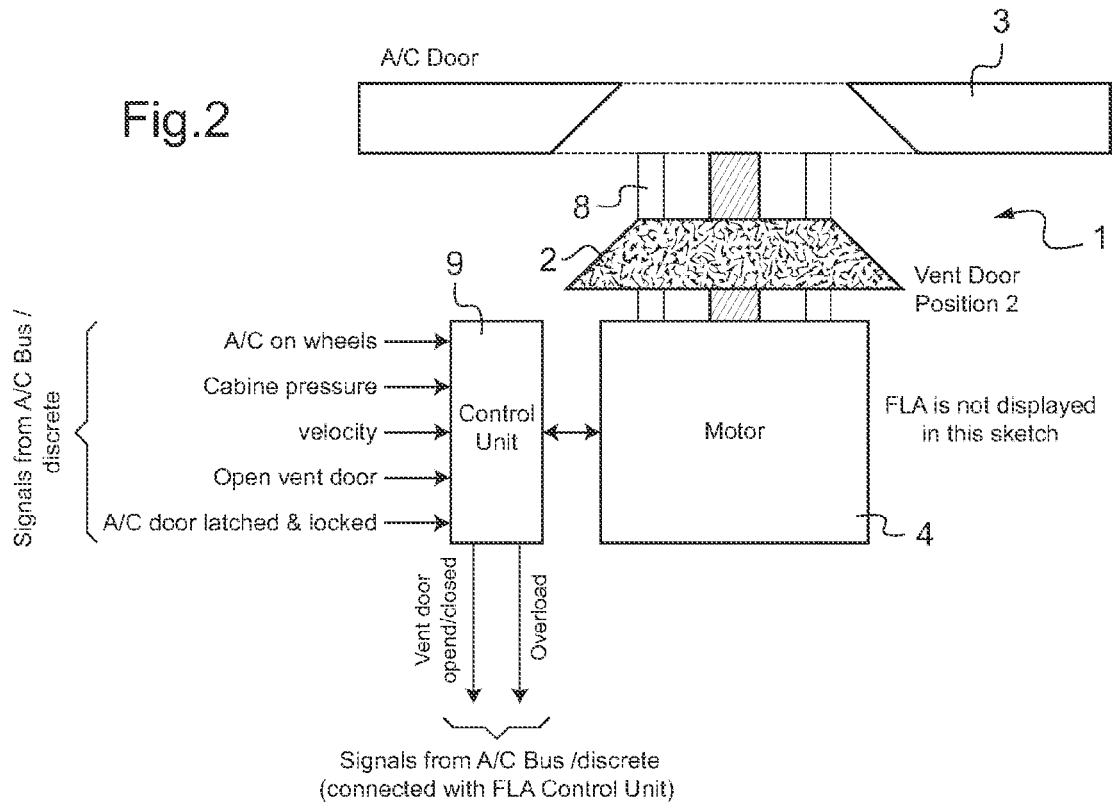

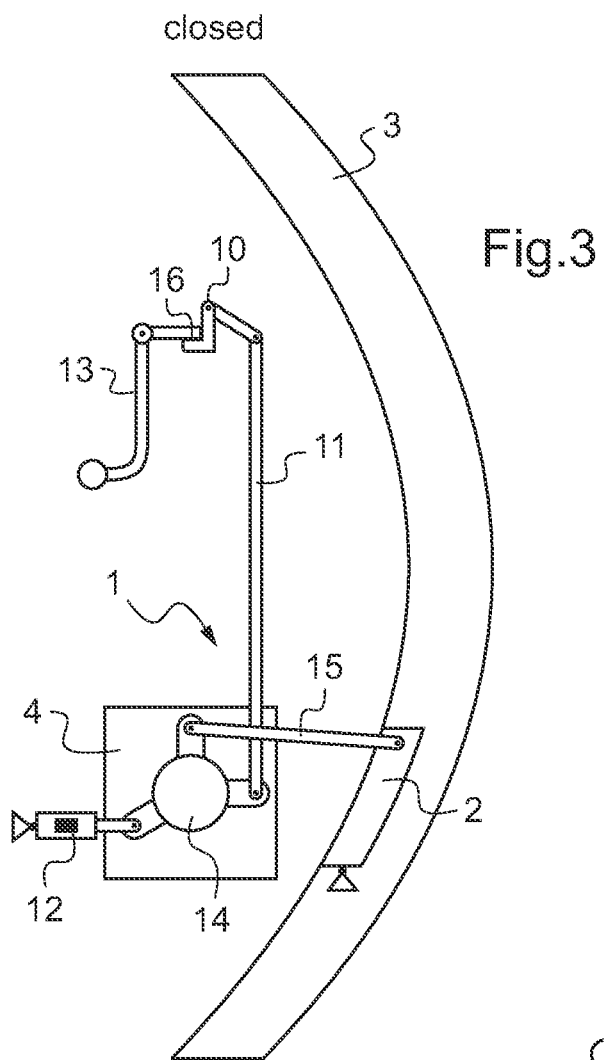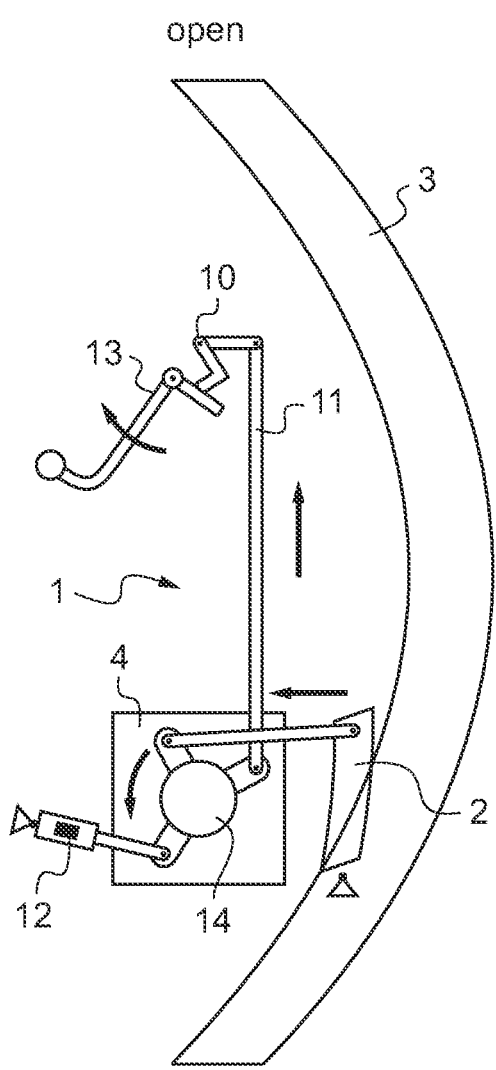

ACTUATING MECHANISM FOR A VENT DOOR

CROSS-REFERENCE TO RELATED APPLICATION

This application claims the benefit of European Application No. EP 10 400038.5 filed on Aug. 5, 2010, the disclosure of which is incorporated in its entirety by reference herein.

BACKGROUND OF THE INVENTION (1) Field of the Invention

The invention relates to an actuating mechanism for a vent door and more particularly to an actuating mechanism for a vent door in an aircraft door that provides for the locking of the aircraft door while opening and closing said vent door.

(2) Description of Related Art

A vent door is typically used on the passenger doors of commercial aircraft to allow the pressure inside the aircraft to be equalized with the pressure on the outside of the aircraft after the aircraft lands. For said purpose the doors of aircrafts are often provided with vent-latch interlock assemblies. A typical vent-latch interlock assembly includes a small pressure vent door that is seated in an opening formed in the aircraft cabin door. A drive linkage is connected between the pressure vent door and a latch assembly that controls the opening, closing, and locking of the aircraft cabin door. Vent doors opening and closing mechanism are normally driven by the door lifting mechanism. The drive linkage is arranged so that it will not close the pressure vent door until the associated aircraft cabin door is latched and locked. Consequently, in the event the aircraft cabin door is not properly closed, the open pressure vent door prevents the aircraft from being pressurized, thus requiring aircraft personnel to take note that there is a problem with the cabin door that requires attention. The aircraft will not take off, when the cabin is not pressurized. Moreover, a typical drive linkage is arranged so that, before the latch assembly is actuated to open the aircraft cabin door, the pressure vent door is initially opened. The pressure vent door and the drive linkage are further constructed so that, when the aircraft's cabin pressure is greater than the ambient pressure, the pressure vent door will not open, and the drive linkage will not move. Since the drive linkage is integrally connected to the latch assembly, this "lock-out" of the drive linkage prevents the actuation of the latch assembly and the unlocking and thus prevents unintended opening of the aircraft door. Thus, a pressure vent door assembly is well-suited for installation to an aircraft cabin door to prevent the door from being opened while the aircraft is in pressurized flight.

The document U.S. Pat. No. 5,305,969 A discloses a latch lock mechanism for opening and closing a translating motion-type aircraft door. The latch lock mechanism includes a latch shaft that is mounted to the door and rotated by a lift lock mechanism with a lift lock cam rotated by a handle shaft that is actuated by a handle. When the handle is rotated, the lift lock cam is similarly rotated so as to cause the upward movement of the door drive linkage in the rotation of the latch shaft to allow the door to clear fixed fuselage stop tabs so that the door can be moved to an open position. An auxiliary latch-hold up cam mechanism forces the door open in the event the latch shaft and associated components fail. A pressure vent door is selectively opened by an associated opener assembly connected to the handle shaft. In the event an attempt is made to open the door while the aircraft is in flight, the pressure vent door opener assembly locks out so as to inhibit movement of the handle shaft that would actuate the latch shaft and open the door. The pressure vent door opener assembly and the link to block the handle shaft form a fairly complex system.

Commercial cargo aircraft provide unique concerns and design considerations over passenger aircraft in that cargo aircrafts provide a large cargo door provided in the side of the fuselage. These cargo doors typically have their own latching mechanisms that are not tied into a vent-latch system. Since the cargo doors of cargo aircraft typically do not contain windows or openings therein, a vent-latch assembly similar to those provided in cabin doors of passenger aircraft cannot be installed within the cargo doors. In addition, due to the size of the cargo doors and the loads that the cargo aircraft carry, the cargo doors often require a secondary locking system or backup locking mechanism to prevent the cargo door from unwanted opening.

The document U.S. Pat. No. 6,454,210 B1 discloses an aircraft vent and cargo door locking mechanism for ensuring the opening, closing, and locking of a cargo door in a cargo door opening formed in an aircraft fuselage. A latch assembly latches the cargo door to the fuselage, and the latch assembly moves between a latched position, wherein the cargo door is closed, and an unlatched position, wherein the cargo door may be opened. A locking assembly locks the latch assembly by moving between a locked position, wherein the latch assembly is maintained in the latched position, and an unlocked position, wherein the latch assembly may move to the unlatched position. A blocker provides a secondary locking mechanism by being slidable connected to the cargo door for movement between a blocked position, wherein the blocker engages and prohibits the locking and latch assemblies from moving to the unlocked and unlatched positions, respectively, and an unblocked position, wherein the blocker is disengaged from the locking and latch assemblies allowing the blocking and latch assemblies to move to the unlocked and unlatched positions, respectively. An actuator is operatively connected to the blocker for actuating the blocker between the blocked and unblocked positions. A vent door is mounted adjacent an opening provided in the aircraft fuselage wherein the opening and the vent door are remote from the cargo door. The actuator is operatively connected to the vent door for actuating the vent door between a vent door closed position and a vent door open position simultaneously with the actuation of the blocker. The pressure vent door and the drive linkage are further configured so that, in the event that the ambient pressure is substantially greater than the aircraft cabin pressure, the pressure vent door will open. This allows air to bleed into the aircraft to reduce the pressure differential between the inside of the aircraft and the ambient environment. The minimization of this pressure differential reduces the force imposed on the aircraft by the surrounding atmosphere. The pressure vent door and the drive linkage form a fairly complex system.

SUMMARY OF THE INVENTION

It is an object of the invention to provide for a simple and reliable actuating mechanism for a vent door in an aircraft door. It is a further object of the invention to provide for a less complex connection between an actuating mechanism and the vent door, decoupled control of the processes of vent door closing and opening and to provide for reduced forces on inner or outer handle groups for said processes of vent door closing and opening.

A solution is provided with an actuating mechanism with the features of claim 1. Preferred embodiments are presented in the subclaims.

According to the invention an actuating mechanism for closing and opening of a vent door in an aircraft door is provided comprising an electric motor drivingly connected to said vent door for driving said vent door in a closing position towards the aircraft door and reversely in an open position, said electric motor being as well drivingly connected to a further equipment such as a flight lock actuator. A control unit is provided controlling said electric motor. Preferably a return spring is provided acting on the vent door to an opening position via a mechanical connection to the electric motor. An advantage of the invention is provided with the independency of the inventive actuation mechanism from any lifting mechanism of the aircraft door thus avoiding any back drive forces between the inventive actuation mechanism and the lifting mechanism of the aircraft door. A further advantage is that the vent door may be arranged at any position in the aircraft door as the inventive actuating mechanism is free from any mechanism of the aircraft door and consequently any complex connection between any such mechanism and the vent door is rendered superfluous. A further advantage is that the vent door may be locked, opened or closed independently from the aircraft door. A further advantage is that the electric-motor is used for more than one equipment resulting in cost, weight and space benefit for less needed parts.

According to an embodiment of the invention the electro motor has limited power not allowing the drive of the vent door against the pressurized cabin of the aircraft with the advantages of allowing the use of a less expensive and less consuming electric motor, avoiding the need for supplemental safety devices in case of a malfunction of the electric motor and less forces on any inner or outer handle group. Preferably the electro-motor is not able to overcome a predetermined critical pressure difference from cabin to outside pressure,— said pressure difference acting in closing direction of the vent door—, to prevent any unintended opening of the vent door.

According to a further embodiment of the invention the return spring has a limited force not allowing the drive of the vent door against the pressurized cabin of the aircraft with the advantages of allowing the use of less stressing springs, avoiding the need for supplemental locking and safety devices in case of a malfunction of the locking of said springs and less forces on any inner or outer handle group.

According to a further embodiment of the invention the drive for the vent door allows a positioning of the vent door beyond its closing position in the aircraft door for removal of any layers of ice outside the aircraft door (deicing). One problem with conventional vent doors is ice build-up. Ice build-up occurs particularly when the air temperature on one side of the vent door is much lower than the air temperature on the other side of the vent door. When the ice builds up around the edges of the door, it can cause the door to become stuck in a closed position. This frequently occurs in commercial aircraft, since the temperatures outside of the aircraft at cruising altitude are usually well below 0° C. By driving of the vent door beyond its closing position in the aircraft door, i. e. by driving of the vent door initially further outside than the normal closing position before the opening process and thus outside the profile of the fuselage, any layers of ice outside the aircraft door can be broken and/or detached allowing subsequent opening operation towards inside as usual of the vent door.

According to a further embodiment of the invention the drive for the vent door comprises a mechanical opening and closing system with a ball screw spindle and guide rails for reliable operation of opening and closing of the vent door relative to the aircraft door.

According to a further embodiment of the invention a the mechanical opening and closing system is provided with an eccentric drive at the electric motor and a drive shaft from the electric motor towards said vent door for reliable opening and closing of the vent door.

According to a further embodiment of the invention the return spring is linked to the eccentric drive of the electric motor for positioning of the vent door and the flight lock actuator in case of malfunction of the electric motor with a lock shaft being preferably provided to drive the flight lock actuator, said lock shaft being linked to the eccentric drive of the electric motor.

According to a further embodiment of the invention inner and outer manual door shafts are provided for un-/locking of the aircraft door said manual door shafts being controlled by said flight lock actuator.

According to a further embodiment of the invention said flight lock actuator is electromagnetic with preferably a gear mechanism and an uplock-hook.

According to a further embodiment of the invention the flight lock actuator is provided with blocking means for a lifting mechanism of the aircraft door. This prevents the aircraft door from being opened while the cabin is pressurized.

According to a further embodiment of the invention the control unit comprises control software and/or hardware for communication and control of power switches and power electronics for control of the respective actuators.

According to a further embodiment of the invention the control unit comprises connection means to an aircraft computer via bus or discrete signals.

According to a further embodiment of the invention a vent door seal is provided between the vent door and the aircraft door.

BRIEF DESCRIPTION OF THE DRAWINGS

Preferred embodiments of the invention are described in the following by reference to the attached drawings showing in:

FIG. 1 a first embodiment of an actuating mechanism according to the invention, FIG. 2 the first embodiment of an actuating mechanism in a second position according to the invention, FIG. 3 a second embodiment of an actuating mechanism according to the invention, and FIG. 4 the second embodiment of the drive for an actuating mechanism in a second position according to the invention.

DETAILED DESCRIPTION OF THE PREFERRED EMBODIMENTS

According to FIG. 1 a vent door 2 is shown in an aircraft door 3 in a closed position and according to FIG. 2 the vent door 2 is shown in an open position relative to said aircraft door 3. An actuating mechanism 1 for the vent door 2 of the aircraft door 3 is driven by an electric motor 4. The electric motor 4 is driving the vent door 2 for opening and closing relative to the aircraft door 3 to control pressure in a cabin (not shown) of an aircraft. The vent door 2 is provided with a bevel shaped circumference 5 for fitting into a complementary bevel shaped opening of the aircraft door 3. A sealing (not shown) is provided between the bevel shaped circumference 5 of the vent door 2 and the bevel shaped opening of the aircraft door 3

The actuating mechanism 1 is drivingly connected to the vent door 2 by a ball screw spindle 6 shifting the vent door 2 from the closed position towards the electric motor 4 to an open position or vice versa along guide rails 7, 8 symmetrically arranged relative to the ball screw spindle 6. The electric motor 4 may be a brushless direct current motor, a direct current motor, a Servo type or may be solenoids supplied with current at 28 V.

Once the vent door 2 is closed the electric motor 1 is not strong enough to drive the vent door 2 into an open position against the pressure maintained inside the cabin of the aircraft relative to a low pressure outside the aircraft in a supposed high altitude thus avoiding any unintentional opening of the vent door 2.

The electric motor 4 is suitable to drive the vent door 2 after landing of the aircraft at least once for a short moment from a closed position further outside than the normal closing position and thus outside the outer profile of the aircraft door 3, to break and/or detach any layers of ice outside the aircraft door 3 allowing subsequent opening of the vent door 2 without obstruction through ice layers.

The electric motor 4 is controlled by a control unit 9 of adapted control electronics. The control unit 9 receives signals from an aircraft data bus or discrete signals providing parameters indicating the operating conditions of the aircraft, such as: A/C on wheels, indicating whether the aircraft is grounded, cabin pressure, aircraft velocity, open vent door 2 and aircraft door 3 latched and locked. A signal indicating e. g. to the control unit 9 the operating condition of the aircraft as "vent door 2 and aircraft door 3 latched and locked" blocks the electric motor 4 in its position. The control unit 9 processes said parameters for commands to the electric motor 4 and to a bus connected to a control unit (not shown) of a flight lock actuator. The control unit 9 comprises control software and/or hardware for communication and control of power switches (not shown) and power electronics (not shown) for control of actuators (not shown). The output of the control unit 9 indicates: "Vent door closed/opened" or "Overload" to a control unit of the flight lock actuator via the aircraft data bus or discrete signals.

The data buses may be CAN, ARINC 429, etc. . . .

According to FIG. 4 the vent door 2 is shown in an open position and according to FIG. 3 the vent door 2 is shown in a closed position. Corresponding features are referred to with the same reference numbers as in FIG. 1 or 2.

The electric motor 4 of the actuating mechanism 1 is provided with an eccentric drive 14 including an optional gear box. A return spring 12 is mechanically linked to the eccentric drive 14 of the electric motor 14 and biases the eccentric drive 14 to pull the vent door 2 towards an open position (FIG. 4), said return spring 12 having a spring constant not allowing a sufficiently strong force to withdraw the vent door 2 from the closed position against any internal cabin pressure above an atmospheric pressure outside the grounded aircraft.

The electric motor 4 is driving as well a flight lock actuator 10 as further equipment that controls the locking and subsequently the opening or closing of the aircraft door 3. The flight lock actuator 10 is linked by means of a lock shaft 11 to the eccentric drive 14 of the electro motor 4 and interacts with an uplock-hook 16, said eccentric drive 14 actuating as well the drive shaft 15 for opening and closing of the vent door 2.

An inner handle 13 is provided for unlocking of the aircraft door 3, said inner handle 13 being blocked to keep the aircraft door 3 via said flight lock actuator 10 in its locked position by interacting with the electric motor 4 via the control unit 9 and signaling to the control unit 9 the operating condition of the aircraft as "vent door 2 and aircraft door 3 latched and locked".

The inner handle 13 may be pivoted manually for unlocking of the aircraft door 3 once the electric motor 1 is actuated by the control unit 9 of the aircraft to open vent door 2 (FIG. 4), said flight lock actuator 10 being provided with blocking means for a lifting mechanism of the aircraft door 3.

Anti clockwise actuation of the electric motor 4 with the bias of return spring 12 opens the vent door 2 and allows unlocking of the flight lock actuator 10 after shifting lock shaft 11 upwardly. Clockwise actuation of the electric motor 4 against the bias of return spring 12 closes the vent door 2 after manual locking of the flight lock actuator 10.

What is claimed is:

1. An actuating mechanism for opening and closing a vent door relative to an aircraft door, the mechanism comprising:
   an electric motor drivingly connected to the vent door,
   a flight lock actuator driven by the electric motor, and
   a control unit for controlling the electric motor, wherein the control unit commands the electric motor to drive the flight lock actuator between at least a first position in order to open and close the vent door independent from opening and closing the aircraft door, wherein the vent door is pivotally attached to the aircraft door;
   wherein the flight lock actuator is decoupled from an opening mechanism for opening the aircraft door such that both the vent door and aircraft door are operable to be opened independently and simultaneously with each other.

2. The actuating mechanism according to claim 1, wherein a return spring is provided for biasing the vent door to an open position.

3. The actuating mechanism according to claim 2, wherein the return spring biases the vent door via a mechanical connection to the electric motor.

4. The actuating mechanism according to claim 1, wherein the electric motor has limited power that disallows opening of the vent door against a pressurized cabin of the aircraft.

5. The actuating mechanism according to claim 2, wherein the return spring has a limited force that disallows opening of the vent door against a pressurized cabin of the aircraft.

6. The actuating mechanism according to claim 1, wherein a drive for the vent door allows a positioning of the vent door beyond its closing position in the aircraft door.

7. The actuating mechanism according to claim 1, wherein a drive for the vent door comprises a mechanical opening and closing system with a ball screw spindle and guide rails.

8. The actuating mechanism according to claim 1, wherein the mechanical opening and closing system is provided with an eccentric drive at the electric motor and a drive shaft towards the vent door.

9. The actuating mechanism according to claim 8, wherein a return spring is linked to the eccentric drive of the electric motor for positioning of the vent door.

10. The actuating mechanism according to claim 8, wherein a lock shaft is provided to drive the flight lock actuator, the lock shaft being linked to the eccentric drive of the electric motor.

11. The actuating mechanism according to claim 10, wherein an inner handle is provided for manual un-locking of the aircraft door wherein the inner handle is connected to the flight lock actuator such that the aircraft door is prevented from being unlocked when the flight lock actuator is in a locked position.

12. The actuating mechanism according to claim 1, wherein a vent door seal is provided between the vent door and the aircraft door.

13. An aircraft comprising:
   an aircraft door;
   a vent door pivotally attached to the aircraft door and operable independent of the aircraft door, the vent door operable between at least an open position to vent the aircraft and a closed position;

an actuating mechanism operably connected to the vent door for opening and closing the vent door, the actuating mechanism being decoupled from an aircraft door opening mechanism such that both the vent door and aircraft door are operable to be opened independently and simultaneously with each other; and a control unit in communication with actuating mechanism, wherein the control unit commands the actuating mechanism to open and close the vent door independent from operation of the aircraft door.

14. The aircraft according to claim 13, further comprising a return spring provided between the vent door and the actuating mechanism for biasing the vent door to an open position, wherein the return spring has a spring force less than a pressurized force required to open the vent door when the aircraft is pressurized.

15. The aircraft according to claim 13, wherein the actuating mechanism includes an electric motor, wherein the electric motor is sized with a limited force being less than a pressurized force required to open the vent door when the aircraft is pressurized.

16. The aircraft according to claim 13, further comprising a manual handle for manually unlocking of the aircraft door, wherein the manual handle is connected to the actuating mechanism such that the aircraft door is prevented from being unlocked when the actuating mechanism is in a locked position.

17. An aircraft comprising:
an aircraft door;
an opening mechanism operable for opening the aircraft door;
a vent door pivotally attached to the aircraft door and operable independent of the aircraft door, the vent door operable between at least an open position to vent the aircraft and a closed position;

an actuating mechanism operably connected to the vent door for opening and closing the vent door, the actuating mechanism being decoupled from the opening mechanism of the aircraft door so that the vent door is operable to be opened and closed independently from the aircraft door; and a control unit in communication with the actuating mechanism, wherein the control unit commands the actuating mechanism to open and close the vent door independent from operation of the opening mechanism of the aircraft door.

18. The aircraft according to claim 17, wherein the actuating includes an electric motor, wherein a return spring is provided between the vent door and the electric motor for biasing the vent door to an open position, wherein the return spring has a spring force less than a pressurized force required to open the vent door when the aircraft is pressurized.

19. The aircraft according to claim 18, wherein the electric motor is sized with a limited force being less than a pressurized force required to open the vent door when the aircraft is pressurized.

20. The aircraft according to claim 17, wherein the opening mechanism includes a manual handle for manually unlocking of the aircraft door, wherein the manual handle is connected to the actuator mechanism such that the aircraft door is prevented from being unlocked when the actuator mechanism is in a locked position.

* * * * *